(12) United States Patent
Lam (10) Patent No.: US 9,429,750 B2
(45) Date of Patent: Aug. 30, 2016

(54) DUST-FREE LENS DRIVING APPARATUS

(71) Applicant: Sunming Technologies (HK) Limited, Hong Kong (HK)

(72) Inventor: Sio Kuan Lam, Hong Kong (HK)

(73) Assignee: SUNMING TECHNOLOGIES (HK) LIMITED, Hong Kong (HK)

( * ) Notice: Subject to any disclaimer, the term of this patent is extended or adjusted under 35 U.S.C. 154(b) by 177 days.

(21) Appl. No.: 14/284,383

(22) Filed: May 21, 2014

(65) Prior Publication Data

US 2015/0070765 A1 Mar. 12, 2015

Related U.S. Application Data (60) Provisional application No. 61/876,767, filed on Sep. 12, 2013.

(51) Int. Cl.
*G02B 27/00* (2006.01)
*G03B 3/10* (2006.01)
*G02B 7/08* (2006.01)

(52) U.S. Cl.
CPC .............. *G02B 27/0006* (2013.01); *G02B 7/08* (2013.01); *G03B 3/10* (2013.01); *G03B 2205/0069* (2013.01)

(58) Field of Classification Search
None
See application file for complete search history.

(56) References Cited

U.S. PATENT DOCUMENTS

| | | | | |
|---|---|---|---|---|
| 3,246,563 | A * | 4/1966 | Quammen | F16J 15/52 359/513 |
| 6,038,087 | A * | 3/2000 | Suzuki | G02B 7/102 359/819 |
| 7,227,285 | B2 | 6/2007 | Osaka | |
| 7,433,136 | B2 * | 10/2008 | Ichikawa | G02B 7/026 359/811 |
| 7,910,355 | B2 * | 3/2011 | Tsuchiya | C12M 41/14 359/395 |
| 2008/0265134 | A1 | 10/2008 | Kinoshita | |

OTHER PUBLICATIONS

Search Report of counterpart European Patent Application No. 14184438.1 issued on Jul. 21, 2015.

* cited by examiner

*Primary Examiner* — Derek S Chapel (57) ABSTRACT

A dust-free lens driving apparatus includes a lens holder for holding a lens, a housing having a central bore in which the lens holder moves, and a film having a first contact region, a second contact region and a buffer region. The first contact region is defined by a first peripheral portion of the film and is used to sealingly attach the film to and around the lens holder. The second contact region is defined by a second peripheral portion of the film and is used to sealingly attach the film to and around a connection portion of the housing. The buffer region is defined by a remaining region of the film between the first and second contact regions and is used to seal an exit of a gap between the lens holder and the housing.

17 Claims, 5 Drawing Sheets

DUST-FREE LENS DRIVING APPARATUS

CROSS-REFERENCE TO RELATED APPLICATIONS

This application claims the benefit of U.S. Provisional Application No. 61/876,767, filed Sep. 12, 2013, the entire content of which is hereby incorporated by reference.

FIELD OF THE TECHNOLOGY

The present application relates generally to a dust-free lens driving apparatus, and particularly to a dust-covering film for a dust-free lens driving apparatus.

BACKGROUND

Voice coil motor (VCM) is the mainstream technology to linearly drive a lens to achieve autofocus function of a camera module of a mobile phone. Various VCM designs have been invented to provide such lens driving capability. For most of the VCMs design, there is one serious problem which has still no effective solution since VCM has been applied as a lens driving apparatus of a camera module. This problem is known as the dust particle problem. Due to the very simple structure of a camera module, the VCM or lens driving apparatus is directly mounted on a PCB board, on which an imaging sensor is mounted. As a result, the VCM or lens driving apparatus directly faces the imaging sensor. If any dust particle can go through the VCM or lens driving apparatus, it will fall onto the surface of the imaging sensor. This will cause an image defect because a dark spot will be formed on the image. Therefore, camera module manufacturers all assemble the camera module in a precisely controlled clean room to avoid dust particle contamination during assembly. However, after the assembly process, the camera module will be installed into a mobile phone and go to the end user. In normal application environment, the atmosphere outside the camera module could be very dusty. Dust particles can pass through the VCM and falls onto the imaging sensor surface due to the tiny gap between the moving part and the stationary part, which is the lens holder and the base (and/or casing) respectively. This dust particle issue has been one of the major quality problems to all the VCM manufacturers and camera module manufacturers. Some VCM manufacturers have been losing money due to the cost increased by the failure caused by dust particles. Therefore, it is very important to have some kinds of mechanisms to prevent dust particle contamination.

The above description of the background is provided to aid in understanding the dust-free lens driving apparatus, but is not admitted to describe or constitute pertinent prior art to the dust-free lens driving apparatus, or consider the cited documents as material to the patentability of the claims of the present application.

SUMMARY

According to one aspect, there is provided a dust-free lens driving apparatus including a lens holder for holding a lens, a housing, and a film having a first contact region, a second contact region, and a buffer region. The first contact region is defined by a first peripheral portion of the film and is used to sealingly attach the film to and around the lens holder; the second contact region is defined by a second peripheral portion of the film and is used to sealingly attach the film to and around a connection portion of the housing; and the buffer region is defined by a remaining region of the film between the first and second contact regions and is used to seal an exit of a gap between the lens holder and the housing.

The dust-free lens driving apparatus may further include at least one elastic leaf spring connecting the lens holder and a stationary portion of the housing, at least one coil, and at least one permanent magnet operatively coupled with the at least one coil. The dust-free lens driving apparatus may further include at least one yoke in which the at least one permanent magnet is mounted to thereby conduct or confine magnetic flux or magnetic field. The dust-free lens driving apparatus may further include a coil holder which is connected to the lens holder.

In one embodiment, the first contact region can be attached to a lower end of the coil holder which is connected to a lower end of the lens holder, and the second contact region is attached to a magnet holder fixedly mounted on the housing.

According to another aspect, there is provided a dust-covering film for a dust-free lens driving apparatus having a lens holder moveable within a central bore of a housing. The film may include a first contact region, a second contact region, and a buffer region. The first contact region is defined by a first peripheral portion of the film and is used to sealingly attach the film to and around the lens holder; the second contact region is defined by a second peripheral portion of the film and is used to sealingly attach the film to and around a connection portion of the housing; and the buffer region is defined by a remaining region of the film between the first and second contact regions and is used to seal an exit of a gap between the lens holder and the housing. The film may be made of a material selected from the group consisting of a stretchable material, a soft and flexible material, a resilient material and a foldable material.

In one embodiment, the dust-covering film may include a central opening. The first contact region may be defined by an inner peripheral portion of the film extending around the central opening, and the second contact region may be defined by an outer peripheral portion of the film.

In one embodiment, the film may be formed into a tube. The first contact region may be defined by an upper peripheral portion of the tube, and the second contact region may be defined by a lower peripheral portion of the tube.

In one embodiment, the buffer region may include a single fold having a V-shaped cross section. In another embodiment, the buffer region may include accordion-like folds having a zig-zag cross section.

In one embodiment, the film may be made of a stretchable material, and the width of the buffer region between the first and second contact regions may be substantially equal to the width of the gap.

In another embodiment, the film may be made of a soft and flexible material, and the width of the buffer region between the first and second contact regions may be at least equal to a maximum width of the gap.

In a further embodiment, the film may be made of a resilient material and may serve as a leaf spring between the lens holder and the housing.

The dust-covering film may be made of a material selected from the group consisting of paper, plastic, polymer, rubber, nylon, metal and a combination thereof.

In one embodiment, the first and second contact regions may have shapes that conform with the shapes of the lens holder and the housing to which the first and second contact regions are attached respectively. The first and second contact regions may be annular in shape. In another embodiment, the first contact region may be annular in shape and the second contact region may be rectangular in shape.

The first and second contact regions can be attached to the lens holder and the housing respectively by an adhesive material. In one embodiment, the second contact region can be attached to the housing by a fastener.

According to yet another aspect, there is provided an electronic image-capturing device including a dust-free lens driving apparatus disclosed in the present application.

Although the dust-free lens driving apparatus is shown and described with respect to certain embodiments, it is obvious that equivalents and modifications will occur to others skilled in the art upon the reading and understanding of the specification. The dust-free lens driving apparatus in the present application includes all such equivalents and modifications, and is limited only by the scope of the claims.

BRIEF DESCRIPTION OF THE DRAWINGS

Specific embodiments of the dust-free lens driving apparatus will now be described by way of example with reference to the accompanying drawings wherein.

DETAILED DESCRIPTION

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe such embodiments, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is under stood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be noted that throughout the specification and claims herein, when one element is said to be "attached" or "connected" to another, this does not necessarily mean that one element is fastened, secured, or otherwise attached to another element. Instead, the term "attached" or "connected" means that one element is either connected directly or indirectly to another element or is in mechanical or electrical communication with another element.

As used herein, the term "housing" means the stationary portion or components of the lens driving apparatus.

Figure 1:
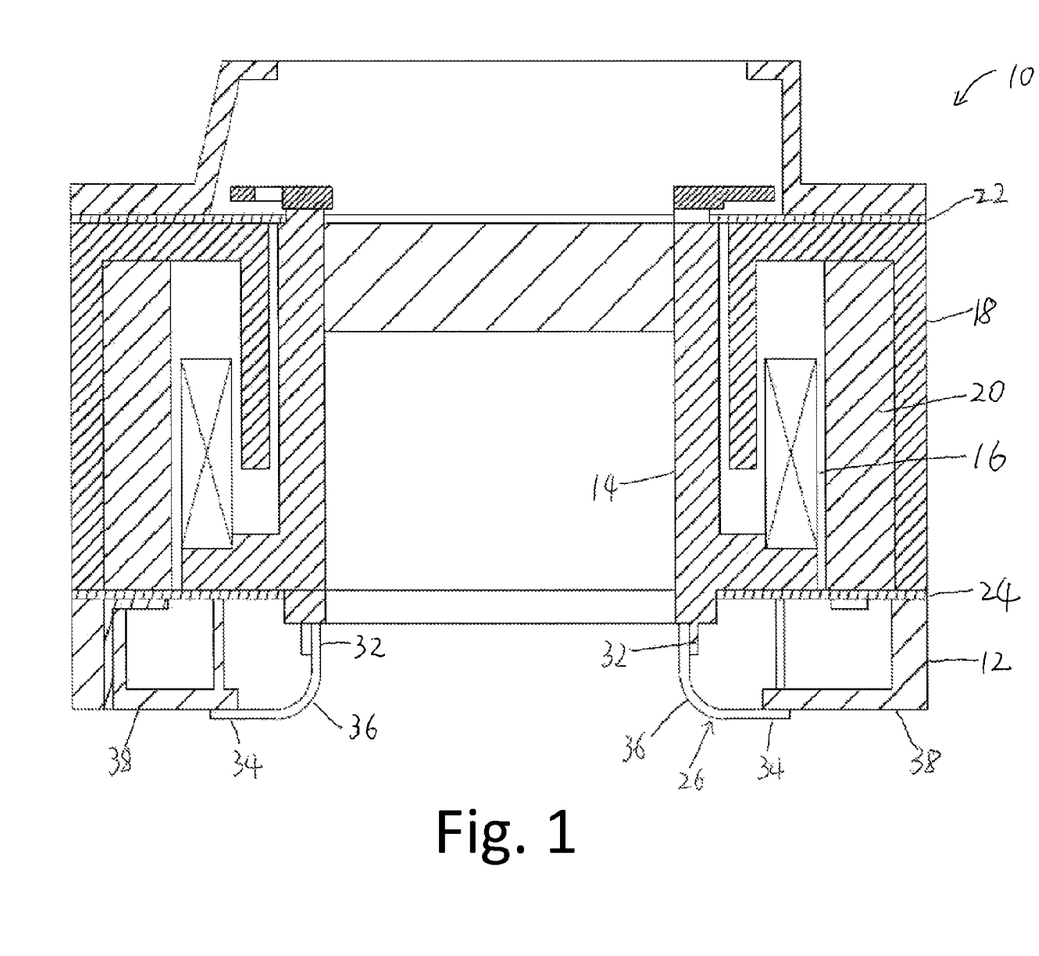
FIG. 1 is a cross sectional view of a dust-free lens driving apparatus according to an embodiment of the present application.

FIG. 1 is a cross-sectional view of a dust-free lens driving apparatus 10 according to an embodiment. The dust-free lens driving apparatus 10 may include a base 12, a lens holder 14, a coil 16 fixedly attached to the lens holder 14, a yoke 18 having a plurality of permanent magnets 20, a pair of leaf springs 22, 24, and a membrane or film 26. The coil 16, the magnets 20 and the leaf springs 22, 24 together can form a driving mechanism capable of moving the lens holder 14. The yoke 18 can be attached firmly to the base 12. The two leaf springs 22, 24 can be attached to the two opposite ends of the lens holder 14 respectively. A first contact area or region 32 of the film 26 may be attached to one end of the lens holder 14, and a second contact area or region 34 of the film 26 may be attached to the base 12. The film 26 can completely seal the gap between the lens holder 14 and the base 12. Therefore, any dust particles trapped inside the lens driving apparatus 10 is impossible to pass through this film 26 and fall onto the surface of the imaging sensor. In this embodiment, the lens holder 14 is the moving part and the base 12 is the fixed or stationary portion. The base 12 can also be a bottom casing or housing of the lens driving apparatus 10. Therefore, the film 26 should be considered as a film connecting a moving part and a fixed or stationary portion of the lens driving apparatus 10.

The basic concept is to use the film 26 to seal the gap between a moving part (in most cases it is the lens holder 14) and a stationary portion (in most cases it is the bottom casing or the base 12). This gap exists because of the spring suspension structure of the current mainstream VCM technology. This gap is the only channel that dust particles can penetrate into the other side of the lens driving apparatus 10 where the imaging sensor is installed. Therefore, if the gap is sealed by some means, dust particles from one side, which is the outside world, and particles trapped inside the lens driving apparatus 10 can never pass the gap and go into the other side of the lens driving apparatus 10.

Figure 4:
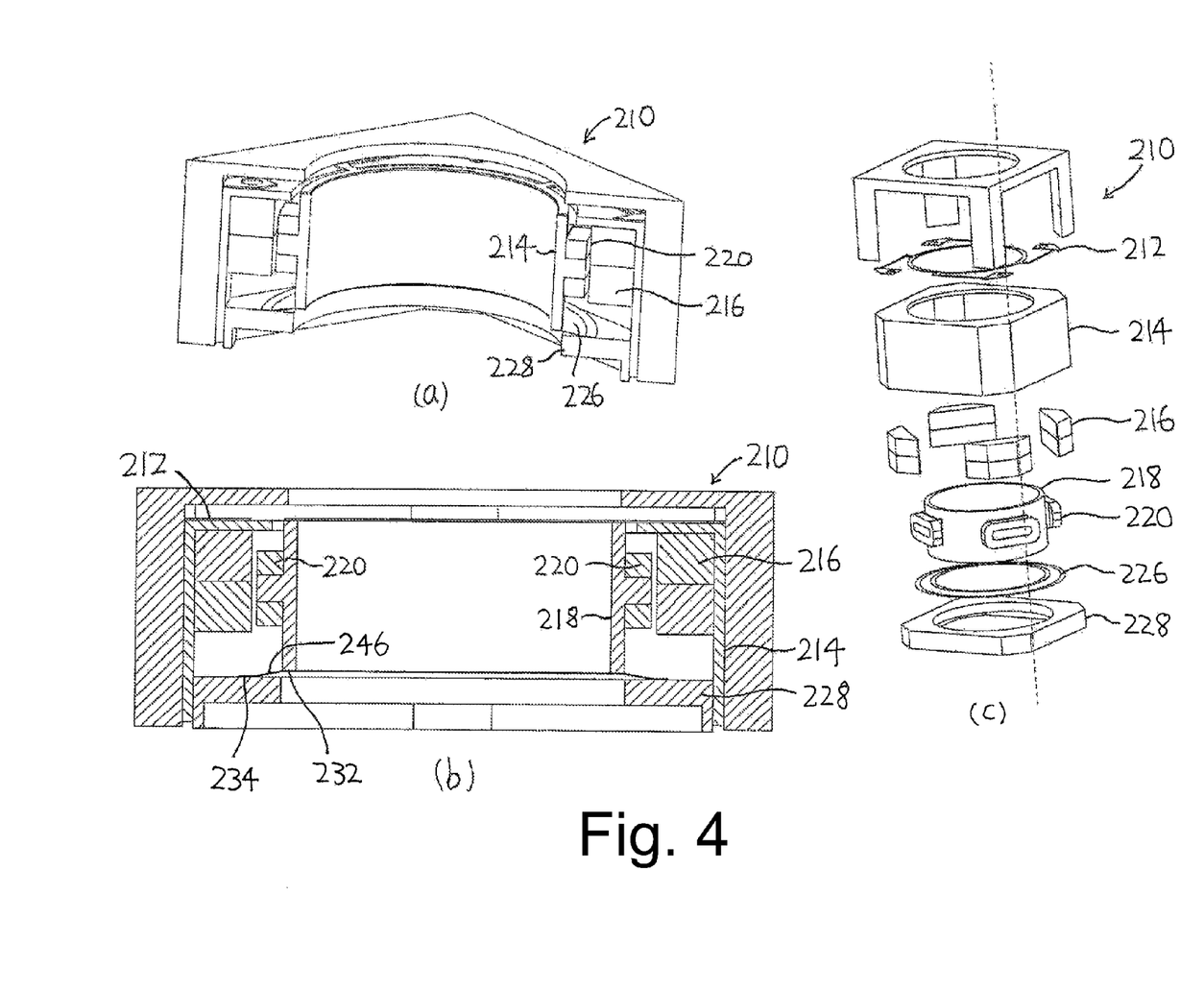
FIGS. 4(a)-4(c) are different views of a dust-covering film of a dust-free lens driving apparatus according to yet another embodiment of the present application.

In some embodiments, the base 12 may not be the best place for the film 26 to connect to (reference to FIG. 4). In such circumstance, the film 26 may be connected to a critical plane, or section, or portion of the lens driving apparatus 10. The critical plane, or section, or portion of a lens driving apparatus 10 is defined as the plane, or section, or portion where the gateway to the other side of the apparatus is located. In camera module application, the lens holder 14 will be installed with a lens assembly. Dust particles outside the lens driving apparatus 10 cannot pass through the lens driving apparatus 10 through the central bore of the lens holder 14. When the gap between the lens holder 14 and the base 12 is sealed by the film 26, there is no way that dust particles trapped inside the lens driving apparatus 10 can pass through the lens driving apparatus 10. Therefore, only if the inner surface 36 of the film 26 and/or the bottom surface 38 of the base 12 contain dust particles, there is absolutely no chance for particles to pass through the lens driving apparatus 10 and fall onto the surface of the imaging sensor. Therefore, manufacturing a dust-free lens driving apparatus 10 becomes easy because only the inner surface 36 of the film 26 and/or the bottom surface 38 of the base 12 should be taken care or under great care of protection from dust contamination.

Figure 3:
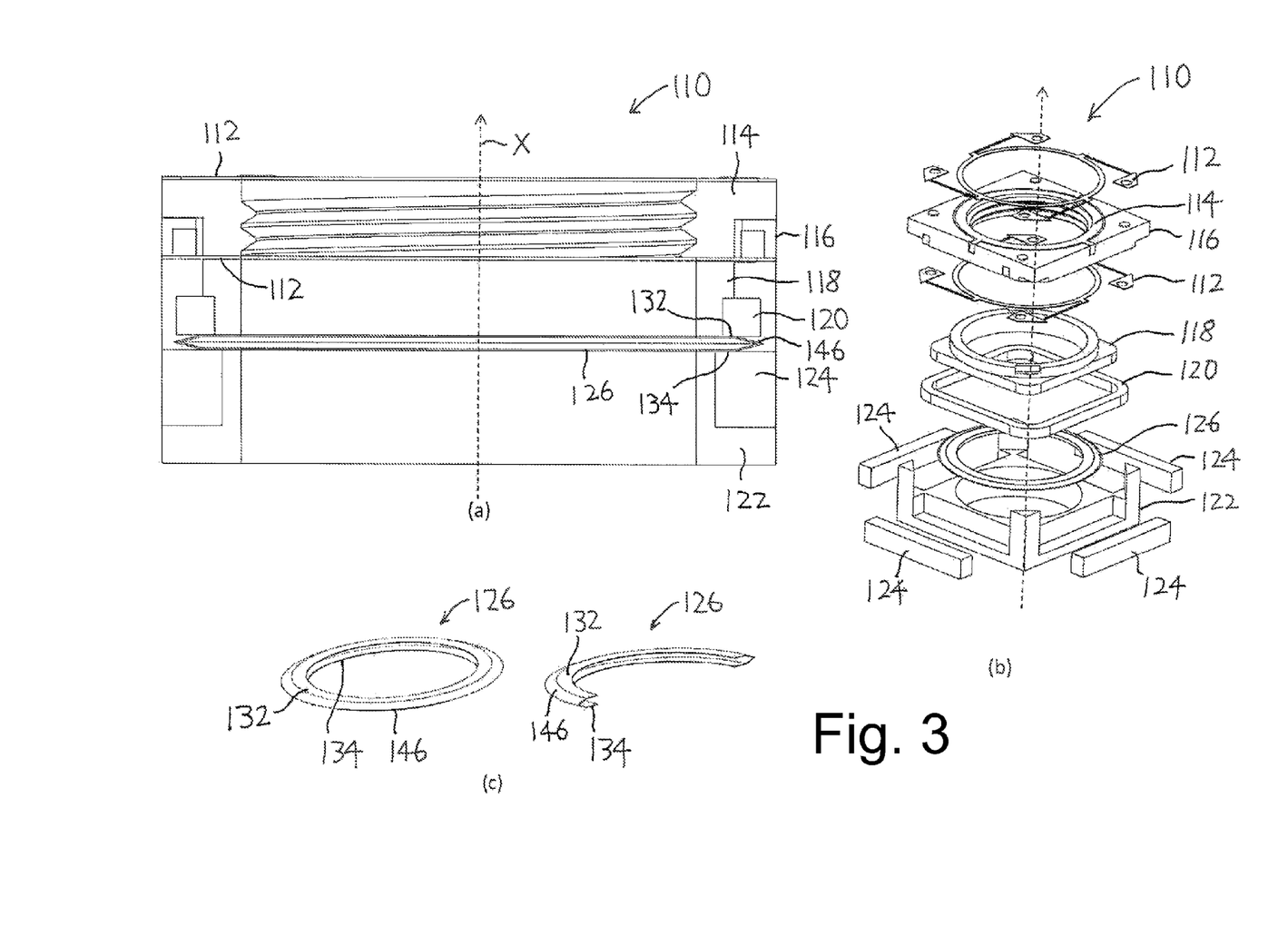
FIGS. 3(a)-3(c) are different views of a dust-covering film of a dust-free lens driving apparatus according to another embodiment of the present application.

Generally, regardless of the details of the structure of the film 26, the film 26 include the first contact region 32, the second contact region 34, and a cover or buffer region 46 (also designated as reference numeral 146 in FIGS. 3(c) and 246 in FIG. 4(b)) extending between the first and the second contact regions 32, 34. As used herein, the term "buffer region" means a region of any device or material that shields, covers or protects against external objects, such as dust particles.

The first and second contact regions 32, 34 can be used to sealingly attach the film 26 to and around the lens holder 14 and the stationary portion (or base 12) respectively. The first and second contact regions 32, 34 may be attached to the lens holder 14 and the base 12 by an adhesive material. The attachment location of the film 26 on the lens holder 14 may not necessary be on a surface at one end of the lens holder 14. In some embodiments, some mechanical features, such as fasteners, clamps or clips, may be provided on the lens holder 14 and the base 12 to firmly hold the film 26. Such features may be formed close to one end of the lens holder 14. The film 26 can be attached to any place on the lens holder 14 where a full coverage of the opening end or gateway of the gap is possible. The buffer region 46 is the region between the two contact regions 32, 34. The buffer region 46 may contain excessive film 26, which is used to cover the exit or opening end of the gap when the lens holder 14 is moving. This opening end of the gap is getting bigger or smaller subject to the lens holder's 14 moving direction. Therefore, there must be enough excess film 26 to cover the opening end of the gap in order to seal the gap at all kinds of operation conditions. The width of the buffer region 46 may be at least equal to a maximum width of the gap, and the buffer region 46 may be made of a soft and flexible material.

In some embodiments, the buffer region 46 may just be barely enough to cover the opening end of the gap at an "Off"-operation state. The width of the buffer region 46 can be substantially equal to the width of the gap, and the buffer region 46 may be made of a stretchable material. Once the lens driving apparatus 10 is "On" and the lens holder 14 starts moving, the film 26 will be stretched by the lens holder 14. In such circumstance, the stretched film 26 will generate elastic force and contribute to the lens holder 14 movement. At such condition, the lens driving apparatus 10 will need to have a stronger current to drive the lens to the expected position comparing with the lens driving apparatus 10 which has the exactly same structural design but without the film 26. On the other hand, if the buffer region 46 is reserved with enough excess film, the film 26 will not generate elastic force or only very minor elastic force will be generated. At such condition, the lens driving apparatus 10 can use a lower current to drive the lens holder 14.

In some embodiments, the film 26 material may be tougher. Therefore, even the buffer region 46 is reserved with an excessive region, length, and/or material, it is still necessary to apply a larger force to the lens holder 14 to get a small displacement of the lens holder 14. Therefore, film material selection is also crucial to the lens driving apparatus 10. Usually, the preferred material of the film 26 includes paper, plastic, polymer, rubber, nylon, thin metal sheet, and composite material, etc. Meanwhile, the thickness and geometry of the film 26 will also affect the film's toughness. Therefore, various combinations of film 26 thickness, geometry, and materials exist, and all the combinations form a wide range of film 26 design for the lens driving apparatus 10.

FIGS. 2(a)-(e) show some embodiments of the dust-covering film 26. FIGS. 2(a) and (b) show the film 26, 26' having a circular shape and a rectangular shape respectively. The center of the film 26, 26' is a circular hole which matches with the circular shape of the end of the lens holder 14. However, the inner and outer peripheries are not necessary circular in shape. All kinds of shape can be applied as long as it fits with the lens holder 14 and the base 12. The outer periphery or inner periphery region is not limited to the border line of the film 26, 26'. It actually refers to a narrow marginal region including the periphery of the film 26, 26'. This marginal region is set for attaching the film 26, 26' to the lens holder 14 or a stationary portion of the base 12. This narrow marginal region is represented by a bold solid line. The first contact region 32, 32' can be defined by an inner peripheral portion of the film 26, 26' extending around the central opening, and the second contact region 34, 34' can be defined by an outer peripheral portion of the film 26, 26'.

FIGS. 2(c), (d), and (e) show perspective view of some embodiments of the film. FIG. 2(c) is a tubular shape of the film 26". The first contact region 32" can be defined by an upper peripheral portion of the tube, and the second contact region 34" can be defined by a lower peripheral portion of the tube. The zigzag line represents a very soft material which can be easily folded by its own weight or naturally folded. Such material can also apply to all kinds of film from FIGS. 2(a) to (e).

Figure 2:
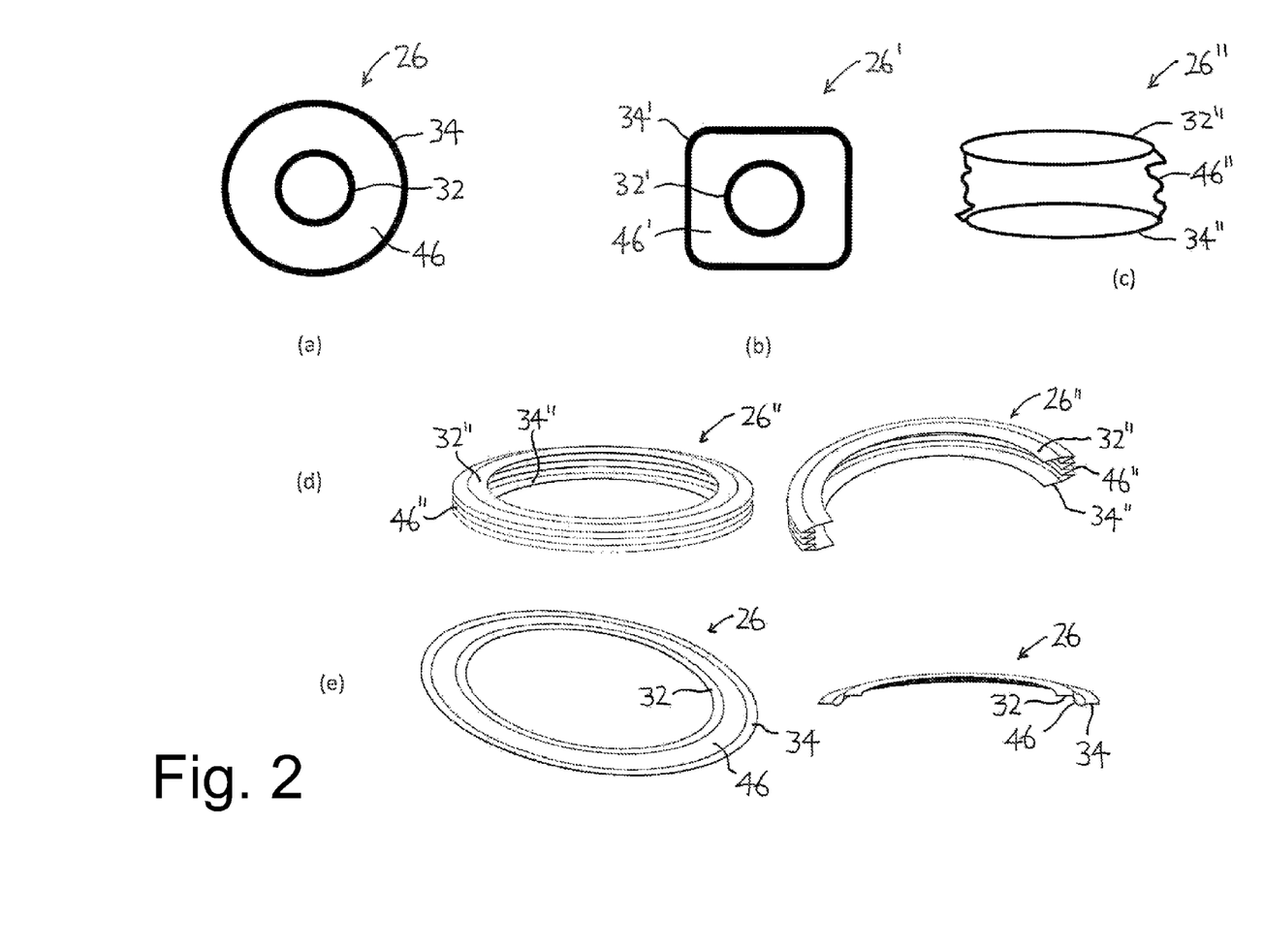
FIGS. 2(a)-2(e) show various embodiments of a dust-covering film of the dust-free lens driving apparatus.

FIGS. 2 (d) and (e) are other embodiments of the film with various structural features. The first and second contact regions 32, 34, 32", 34" can be spaced parallelly apart from each other, and may have the same shape and dimension. In other embodiment, the second contact region 34 may be larger than the first contact region 32. The film 26, 26', 26" can be made of paper, plastic, polymer, rubber, thin metal sheet, composite materials, and any other suitable materials.

FIGS. 3(a)-3(c) are different views of another embodiment of the lens driving apparatus. The lens driving apparatus 110 may include a pair of leaf springs 112, a lens holder 114, a fixed or stationary rigid body 116, a coil holder 118 for holding at least a coil 120, a magnet holder 122 for holding a plurality of magnets 124, and a membrane or film 126. The lens holder 114 can be inserted into the stationary rigid body 116 and moveable along an optical axis X. The two leaf springs 112 can be attached to the opposite ends of the lens holder 114 respectively. The material of leaf springs 112 can be metal, rubber, plastic, paper, and/or elastic materials. In some embodiments, only one leaf spring 112 may be used. The leaf spring 112 may be connecting the lens holder 114 and the stationary rigid body 116 of the housing of the lens driving apparatus 110. In some other embodiments, three or more leaf springs may be used. The coil holder 118 can be firmly attached to one end of the lens holder 114. A first contact region 132 of the film 126 may be attached to the coil holder 118, and a second contact region 134 of the film 126 may be attached to the magnet holder 122. The film 126 can take a lot of forms or shapes different from the current embodiment. The material of the film 126 can be selected from a lot of various materials.

FIGS. 4(a)-4(c) are different views of the lens driving apparatus according to another embodiment. The lens driving apparatus 210 may include a leaf spring 212, a yoke 214 for holding a plurality of magnets 216, a lens holder 218, a plurality of coils 220 firmly attached to the lens holder 218, a membrane or film 226, and a base 228. A first contact region 232 of the film 226 can be attached to a bottom surface of the lens holder 218, and a second contact region 234 can be attached to an upper surface of the base 228. Comparing with a traditional lens driving apparatus, the second leaf spring can be removed and replaced by the film 226. In such an embodiment, the film 226 is not only used to seal the gap between the lens holder 218 and the base 228, but can also be used to perform the function of a leaf spring. The film 226 can be designed to be stretchable along the optical axis. The force needed to stretch the film 226 is comparable to the force needed to stretch a leaf spring for the same amount of stretch. Therefore, the electromagnetic force created by the coils 220 has to overcome the total force created by the leaf spring 212 and the film 226 in order to move the lens holder 218. The stroke of the lens holder 218 will be finally determined by the balance of the electromagnetic force and the total force of the leaf spring 212 and the film 226. This embodiment can save one leaf spring and yet can stop the dust particles trapped inside the lens driving apparatus 210 from falling onto the imaging sensor surface.

In another embodiment, the film 226 may take any of the forms shown in FIG. 2 and/or others. In another embodiment, the lens driving apparatus 210 may not only include a leaf spring 212 and a film 226 used as a spring, but may also include one more leaf spring which work with the first leaf spring 212 to improve the moving direction stability of the lens holder 218. Therefore, the tilting of the lens holder 218 during movement can be minimized and yet dust particles can be trapped by the film 226.

Figure 5:
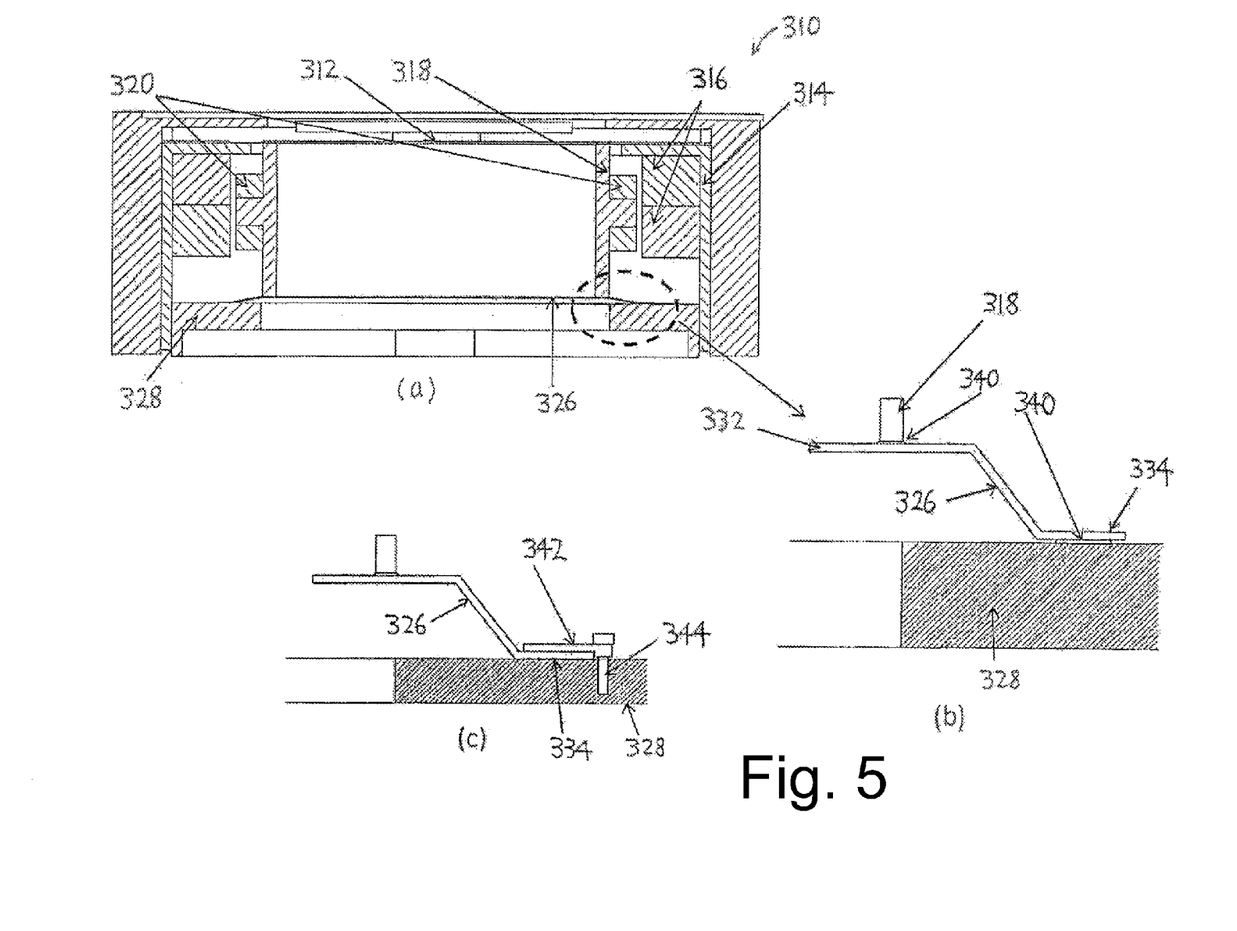
FIGS. 5(a)-5(c) are different views of a dust-covering film of a dust-free lens driving apparatus according to a further embodiment of the present application.

FIGS. 5(a)-5(c) show different views of the lens driving apparatus according to a further embodiment. The lens driving apparatus 310 may include a leaf spring 312, a yoke 314 for holding a plurality of magnets 316, a lens holder 318, a plurality of coils 320 firmly attached to the lens holder 318, a film or a film spring 326, and a base 328. A first contact region 332 of the film 326 can be attached to a bottom surface of the lens holder 318, and a second contact region 334 can be attached to an upper surface of the base 328. When it is a film 326 made of a soft and flexible material, it can seal the gap between the lens holder 318 and the base 328. When it is a film spring 326 made of a resilient material, it is not only used to seal the gap between the lens holder 318 and the base 328, but can also be used to perform the function of a leaf spring. The first and second contact regions 332, 334 can be used to sealingly attach the film 326 to and around the lens holder 318 and the stationary portion (or base 328) respectively. The first and second contact regions 332, 334 may be attached to the lens holder 318 and the base 328 by adhesive material 340, as depicted in FIG. 5(b). In some embodiments, some mechanical features such as fasteners may be used. As depicted in FIG. 5(c), a spacer or a plate 342 may be used to hold the second contact region 334 against an upper surface of the base 328. A headed screw 344 can be driven through an opening formed on the plate 342 and into a threaded bore formed on the base 328, thereby fastening the second contact region 334 firmly between the plate 342 and the base 328.

In the present application, a dust-free lens driving apparatus is described. It will be a key technology for manufacturing a lens driving apparatus without a tight control of the background air quality. In other words, it initiates the possibility of assembling a lens driving apparatus and/or assembling respective components in a low-class clean room, or without a clean room. It is expected to lower down the cost of manufacturing overhead, manpower, tooling and equipment. It is also expected to help to significantly reduce the manufacturing cost due to the failure of assembled lens driving apparatus caused by the dust particle issue and reduce the return rate of the sold lens driving apparatus due to dust particle issue.

The dust-free lens driving apparatus of the present application can be incorporated into any image-capturing electronic devices such as cameras, video recorders, and mobile phones, etc.

While there has been illustrated and described what are presently considered to be example embodiments, it will be understood by those skilled in the art that various other modifications may be made, and equivalents may be substituted, without departing from the central concept described herein. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A dust-free lens driving apparatus comprising:
   (a) a lens holder for holding a lens;
   (b) a housing;
   (c) a driving mechanism capable of moving the lens holder; and
   (d) a film comprising a first contact region, a second contact region, and a buffer region; wherein the first contact region is defined by a first peripheral portion of the film and is used to sealingly attach the film to and around the lens holder, the second contact region is defined by a second peripheral portion of the film and is used to sealingly attach the film to and around a connection portion of the housing, and the buffer region is defined by a remaining region of the film between the first and second contact regions and is used to seal an exit of a gap between the lens holder and the housing;
   wherein the driving mechanism comprises:
   (i) at least one elastic leaf spring connecting the lens holder and the housing;
   (ii) at least one coil; and
   (iii) at least one permanent magnet operatively coupled with the at least one coil;

wherein the dust-free lens driving apparatus further comprises a coil holder which is connected to the lens holder;

the first contact region is attached to a lower end of the coil holder which is connected to a lower end of the lens holder, and the second contact region is attached to a magnet holder fixedly mounted on the housing.

2. The dust-free lens driving apparatus as claimed in claim 1, further comprising at least one yoke in which the at least one permanent magnet is mounted to thereby conduct or confine magnetic flux or magnetic field.

3. The dust-free lens driving apparatus as claimed in claim 1, wherein the film is made of a material selected from the group consisting of a stretchable material, a soft and flexible material, a resilient material and a foldable material.

4. The dust-free lens driving apparatus as claimed in claim 3, wherein the film comprises a central opening, the first contact region being defined by an inner peripheral portion of the film extending around the central opening, and the second contact region being defined by an outer peripheral portion of the film.

5. The dust-free lens driving apparatus as claimed in claim 3, wherein the film is formed into a tube, the first contact region being defined by an upper peripheral portion of the tube, and the second contact region being defined by a lower peripheral portion of the tube.

6. The dust-free lens driving apparatus as claimed in claim 3, wherein the buffer region comprises a single fold having a V-shaped cross section.

7. The dust-free lens driving apparatus as claimed in claim 3, wherein the buffer region comprises accordion-like folds having a zig-zag cross section.

8. The dust-free lens driving apparatus as claimed in claim 3, wherein the film is made of a stretchable material, and the width of the buffer region between the first and second contact regions is substantially equal to the width of the gap.

9. The dust-free lens driving apparatus as claimed in claim 3, wherein the film is made of a soft and flexible material, and the width of the buffer region between the first and second contact regions is at least equal to a maximum width of the gap.

10. The dust-free lens driving apparatus as claimed in claim 3, wherein the film is made of a resilient material and serves as a leaf spring between the lens holder and the housing.

11. The dust-free lens driving apparatus as claimed in claim 3, wherein the film is made of a material selected from the group consisting of paper, plastic, polymer, rubber, nylon, metal and a combination thereof.

12. The dust-free lens driving apparatus as claimed in claim 3, wherein the first and second contact regions have shapes that conform with the shapes of the lens holder and the housing to which the first and second contact regions are attached respectively.

13. The dust-free lens driving apparatus as claimed in claim 12, wherein the first and second contact regions are annular in shape.

14. The dust-free lens driving apparatus as claimed in claim 12, wherein the first contact region is annular in shape and the second contact region is rectangular in shape.

15. The dust-free lens driving apparatus as claimed in claim 3, wherein the first and second contact regions are attached to the lens holder and the housing respectively by an adhesive material.

16. The dust-free lens driving apparatus as claimed in claim 3, wherein the second contact region is attached to the housing by a fastener.

17. An electronic image-capturing device comprising a dust-free lens driving apparatus claimed in claim 1.

* * * * *